United States Patent [19]
Kelley

[11] 3,786,889
[45] Jan. 22, 1974

[54] STEERABLE LOAD TRANSPORTING VEHICLE

[75] Inventor: Douglas M. Kelley, Chesterland, Ohio

[73] Assignee: Euclid, Inc., Cleveland, Ohio

[22] Filed: Feb. 16, 1971

[21] Appl. No.: 115,387

[52] U.S. Cl............................ 180/44 E, 280/96.2 R
[51] Int. Cl........................ B62d 19/00, B60g 9/02
[58] Field of Search 180/60, 65 F, 43 R, 43 B, 43 C, 180/44, 45, 24; 280/93, 124 R, 112, 96.2

[56] References Cited
UNITED STATES PATENTS

| | | | |
|---|---|---|---|
| 2,692,778 | 10/1954 | Stump | 280/112 |
| 3,083,982 | 4/1963 | DeJong | 280/112 |
| 636,999 | 11/1899 | Jamieson | 280/93 X |
| 696,694 | 4/1902 | Pennington | 180/45 X |
| 783,719 | 2/1905 | Campbell | 180/43 R |
| 1,313,937 | 8/1919 | Brinton | 180/43 R |
| 1,914,683 | 6/1933 | Clapper et al. | 180/43 R |
| 2,220,254 | 11/1940 | Maier | 180/43 R X |
| 2,318,245 | 5/1943 | McFarland | 180/45 X |
| 2,804,158 | 8/1957 | Yunker | 180/24 X |
| 3,074,737 | 1/1963 | Peras | 280/124 R X |

*Primary Examiner*—Kenneth H. Betts
*Attorney, Agent, or Firm*—Watts, Hoffmann, Fisher & Heinke

[57] ABSTRACT

A load transporting vehicle is disclosed which includes a vehicle frame having a narrow forward end and a relatively wide rearward end. Forward and rear wheel assemblies support the frame with the forward wheel assemblies being steerable. A suspension for the forward wheel assemblies provides for pivotal steering motion of each assembly about a steering axis which is spaced from the axis of rotation of the associated wheels and between the associated wheel assembly and the frame.

6 Claims, 7 Drawing Figures

INVENTOR.
DOUGLAS M. KELLEY
BY Watts, Hoffmann Fisher & Heinke
ATTORNEYS

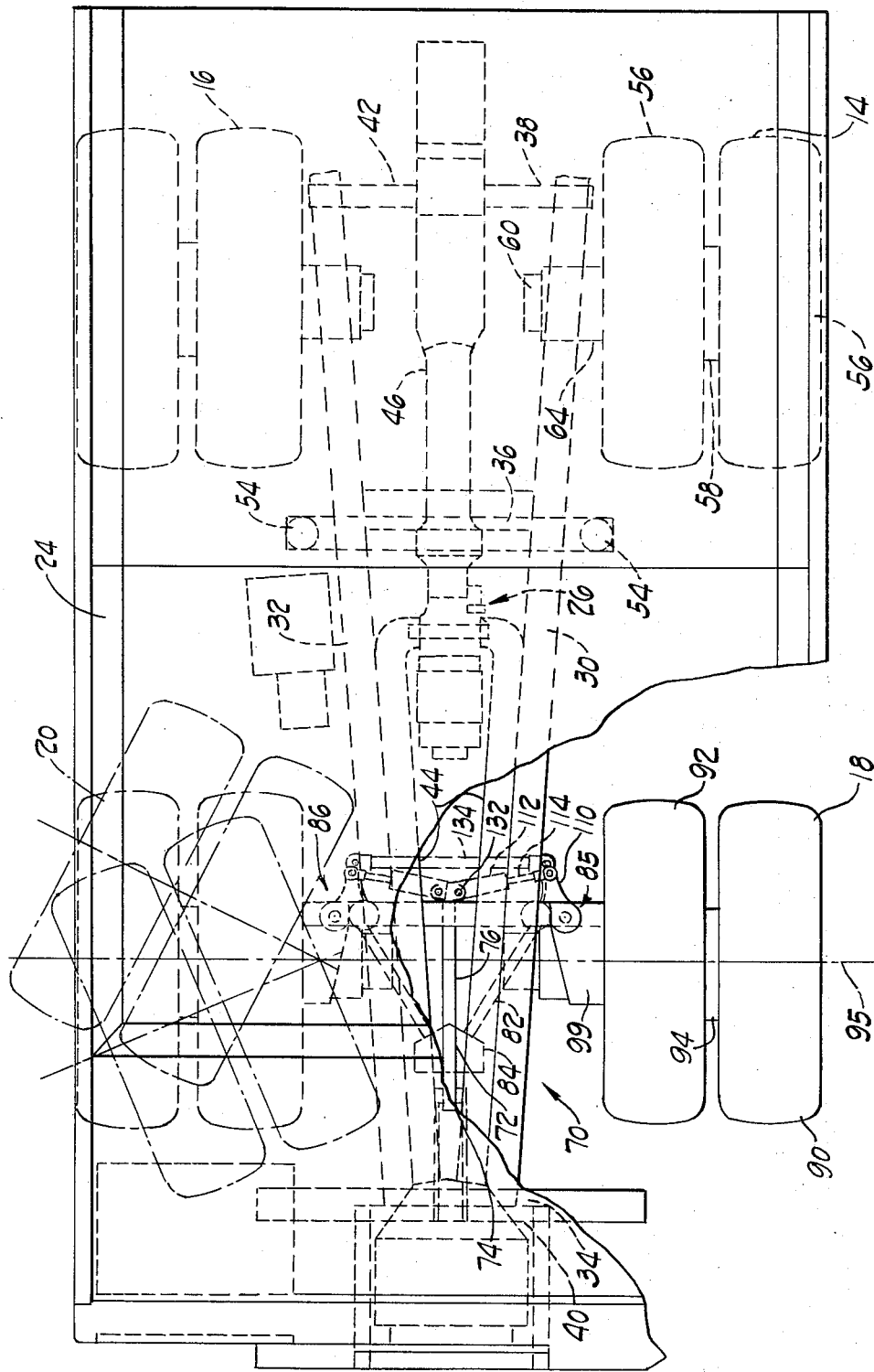

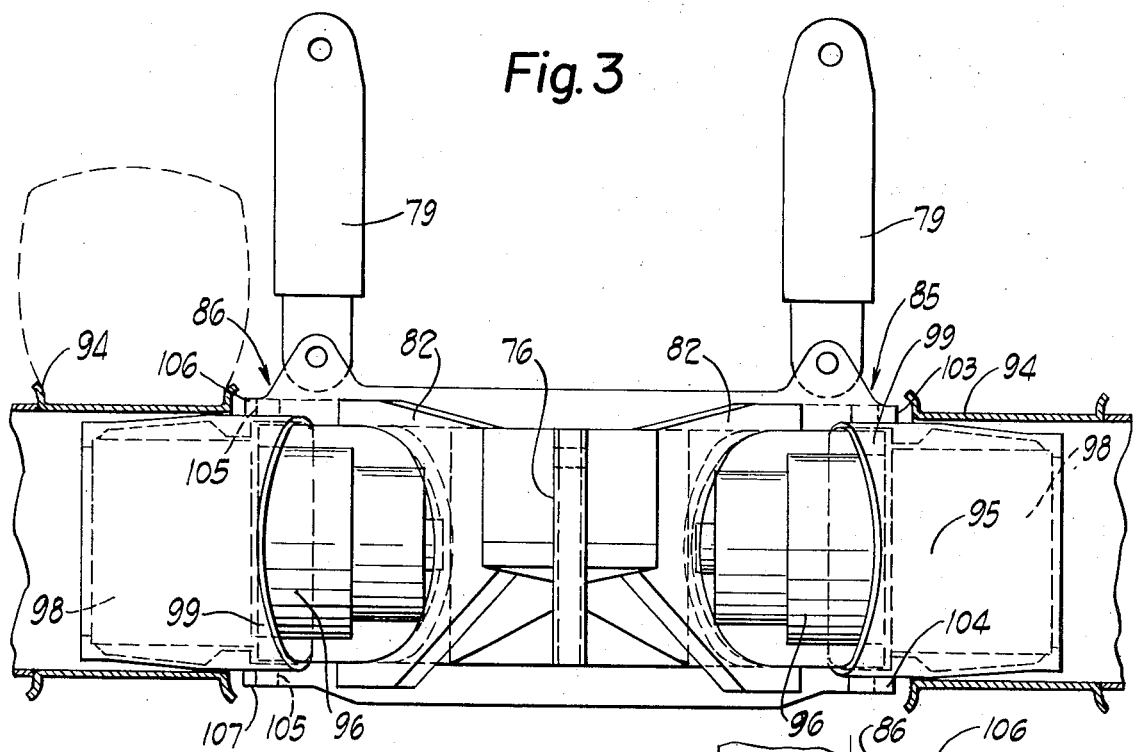
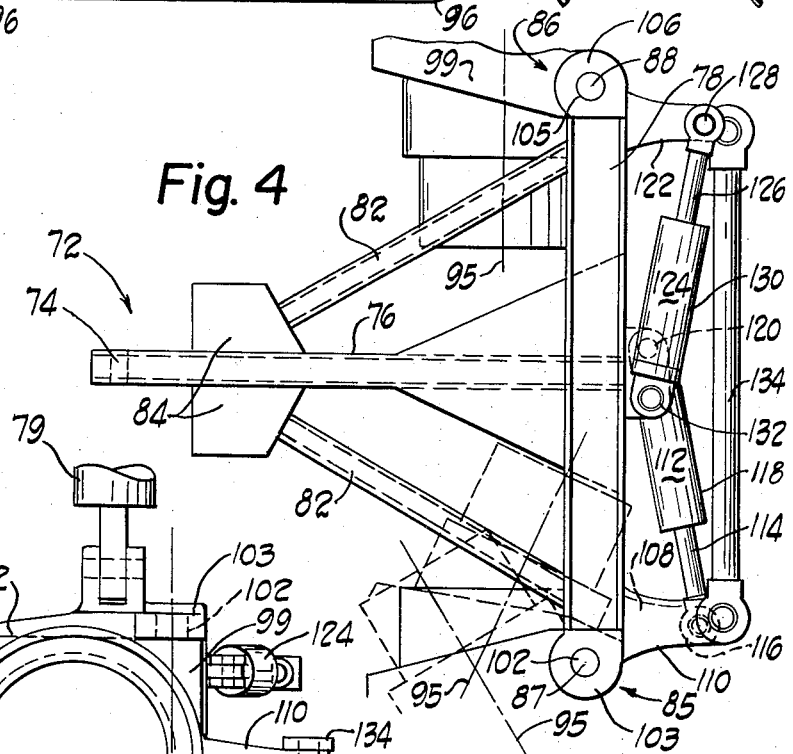
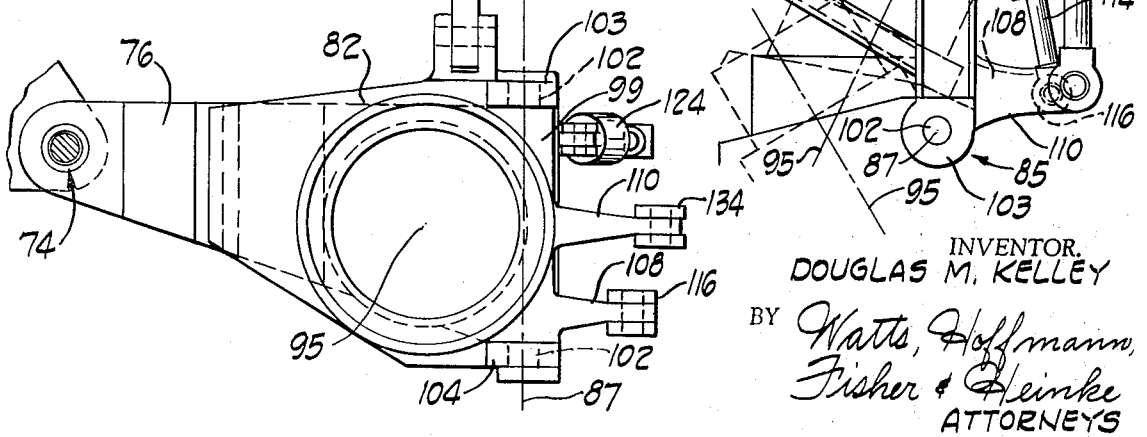

STEERABLE LOAD TRANSPORTING VEHICLE

CROSS REFERENCED COMMON ASSIGNED PATENT APPLICATIONS

U. S. Ser. No. 63,444, filed Aug. 13, 1970, now U.S. Pat. No. 3,695,708, entitled EXHAUST SYSTEM FOR A LOAD DUMPING VEHICLE, by Henry E. Vincenty.

U. S. Ser. No. 115,480 filed Feb. 16, 1971, now U.S. Pat. No. 3,720,446, entitled REAR DUMPING VEHICLE, by Douglas M. Kelley.

BACKGROUND OF THE INVENTION

1. Field of the Invention

The present invention relates to vehicles and more particularly relates to load transporting land vehicles having steerable wheel assemblies.

2. The Prior Art

In prior art vehicles employing steerable wheels, steering mechanisms have been designed according to two principal criteria. The first was that the steering axes, i.e., the vertical axes about which the vehicle wheels are pivoted for steering, be located along a vertical line intersecting the axis of rotation of the individual wheels. The second criterion was that a steering axis was located as closely as possible to the center of the steered wheel in a vertical plane which bisected the wheel longitudinally of the vehicle.

Since large heavily loaded vehicles were sometimes designed utilizing steerable wheel assemblies having dual tires, such vehicles, if designed according to the noted principles, required the steering axis of each wheel assembly to be located along a line intersecting the axis of rotation of the wheel assembly and between the dual tires. This construction was not practical for many types of vehicles and alternate constructions required the steering axis for each wheel assembly to be located inboard of the assembly.

Since dual tire wheel assemblies were laterally wide, steering clearances between the tires and the vehicle frames was limited compared to the steering clearance available for a single tire wheel assembly. Furthermore, in large vehicles of the type referred to frame members were necessarily large to provide adequate load supporting strength. The large frame members, along with the wide wheel assemblies, resulted in the vehicles being relatively unmaneuverable particularly when sharp cornering was required.

Another problem in off-the-highway load transporting vehicles has involved maintaining steering geometry of steerable wheel assemblies. In some prior art proposals, steerable wheel assemblies were connected to the main frame by independent spring suspensions and by steering linkages. When one wheel assembly encountered a bump or depression, the change in elevation relative to the main frame caused the wheel assembly to turn slightly relative to the other wheel assembly as the steering linkage foreshortened. This was undesirable.

To overcome this problem, proposals were made to pivot the wheel assemblies directly to the main frame and eliminate spring suspended steerable wheels. This resulted in vehicles having poor maneuverability and unsatisfactory ride characteristics.

SUMMARY OF THE INVENTION

According to the present invention, a new and improved single frame steerable load transporting vehicle is provided with a novel steering arrangement by which the turning radius of the vehicle is relatively small as compared to equivalent sized vehicles constructed in accordance with the prior art. In a preferred embodiment of the invention, the new vehicle has a wedge-shaped main frame structure, a suspension frame connected to the main frame, and steerable wheel assemblies carried by the suspension frame.

The steerable wheel assemblies support one end of the main frame. Each of these wheel assemblies is steered by pivoting the assembly about a generally vertical axis located between the axis of rotation of tires of the assembly and the wide end of the main frame. The steering axis extends generally vertically between the inboard tire of the assembly and the main frame.

The preferred vehicle is an off-the-highway rear dumping truck having four wheel assemblies, each independently driven by an electric motor forming part of the assembly. The wheel assemblies support the main frame construction and are located beneath the dump body of the truck. The forward wheel assemblies support the narrow end of the main frame and are steerable.

The forward wheel assemblies are connected to the suspension frame which permits the wheel assemblies to move vertically relative to the main frame in response to encountering uneven terrain. Ride springs extend between the suspension frame and the main frame. The suspension frame is joined to each front wheel assembly by a king pin type pivot connection.

Each steering pivot connection provides a generally vertical steering axis about which the associated wheel assembly pivots. The steering axis for each wheel assembly is located rearwardly along the vehicle from the axis of rotation of its wheel assembly. The steering axis is inboard of the wheels of the assembly and located between the adjacent main frame member and the inboard wheel member of the wheel assembly.

The steering axis location also permits the wheel assemblies to be steered through a greater angle than if the steering axis intersected the axis of rotation of the wheels in the associated wheel assembly. This is because the inboard wheel of each assembly may be pivoted through a considerable steering angle before interfering with the adjacent main frame member.

In the preferred construction, the wheel assemblies are steered by actuators connected between the wheel assemblies and suspension frame. The actuators are hydraulically operated and are controlled by the operator of the vehicle through a suitable control system. This arrangement provides sufficient power to assure that the vehicle is easily steered even in rough terrain. A tie rod extends between the wheel assemblies to maintain steering geometry.

A principal object of the present invention is the provision of a new and improved off-the-highway type load transporting vehicle having improved steering maneuverability, ride and handling.

Other objects and advantages of the invention will become apparent from the following detailed description made with reference to the accompanying drawings which form a part of the specification.

BRIEF DESCRIPTION OF THE DRAWINGS

FIG. 2 is a top plan view of the vehicle illustrated in FIG. 1 with portions broken away;

FIG. 3 is a front elevational view of a front wheel suspension assembly of the vehicle shown in FIG. 1;

FIG. 4 is a fragmentary top plan view of the suspension assembly shown in FIG. 3;

FIG. 5 is a side elevational view of the suspension assembly shown in FIGS. 3 and 4;

DESCRIPTION OF A PREFERRED EMBODIMENT

Figure 1:
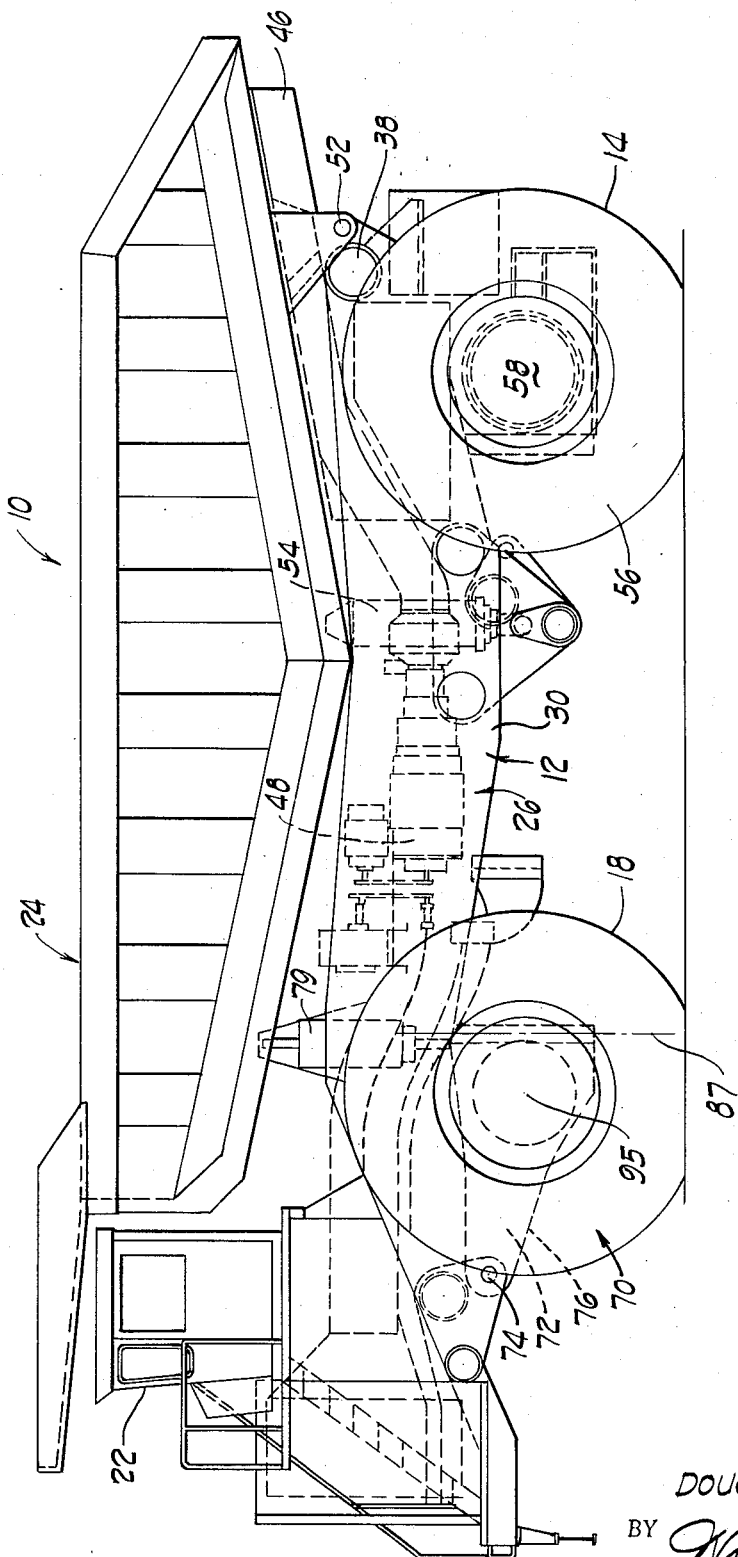
FIG. 1 is a side elevational view of a vehicle embodying the present invention.

A vehicle 10 embodying the present invention is illustrated in FIGS. 1 and 2 in the form of an off-the-highway rear dumping truck. The truck 10 includes a mainframe 12, supported by rear wheel assemblies 14, 16 and front wheel assemblies 18, 20. The frame 12 supports an operator's cab 22, a dump body 24 and a prime mover 26 supported beneath the dump body.

The frame 12 includes main frame members 30, 32 and lateral support frame members 34, 36, 38. The frame members 30, 32 extend longitudinally of the vehicle 10 and converge toward each other at an acute angle proceeding toward the forward end 40 of the frame. The lateral 34 is located at the forward end 40 of the frame. The lateral 38 is located at the rearward end 42 of the frame at which the distance between the frame members 30, 32 is maximum. Because of the shape of the main frame 12, as viewed in plan (FIG. 2), the frame 12 is referred to as "wedge-shaped."

The prime mover 26 is preferably a gas turbine engine having intake and exhaust ducts 44, 46, respectively. An electric power generator 48 is supported adjacent the engine and is driven from the engine to provide an electrical power supply for electrical components of the vehicle. A pump of a hydraulic system is also driven from the engine and this pump supplies hydraulic fluid under pressure for hydraulically operated steering system.

The dump body 24 is connected to the frame 12 by pivot constructions 52 which are aligned along a horizontal axis and permit the dump body to tilt vertically relative to the frame during dumping. Hydraulic rams 54 are connected between the lateral frame member 36 and the dump body 24. These rams move the dump body about the pivot constructions 52.

The rear wheel assemblies 14, 16 are identical and only the assembly 14 is described. The assembly 14 includes dual ground engaging tires 56 each mounted on a hub 58. An electric motor 60 drives the hub through a suitable transmission connected between the output shaft of the motor and the hub 58. A motor housing 64 supports the motor and is connected to the frame 12 by a suitable suspension arrangement.

The forward end 40 of the frame is supported on the front wheel assemblies by a suspension system 70 (FIG. 1). The suspension system 70 provides for vertical motion of the wheel assemblies relative to the frame and for pivoting each wheel assembly about a steering axis for that assembly.

The system 70 includes a suspension frame 72 connected to the forward end 40 of the frame 12 by a hinge construction 74. The hinge construction 74 enables vertical movement of the front wheel assemblies relative to the main frame. The hinge 74 enables a limited amount of twisting movement of the suspension frame about a longitudinal line through the truck. This permits one wheel assembly to change elevation slightly relative to the other assembly.

Referring to FIGS. 3-5, the suspension frame 72 includes a central frame section 76, forming a knuckle of the hinge 74, and which extends rearwardly from the hinge. The knuckle has sufficient free play to permit the above mentioned twisting motion of the suspension frame. A lateral supporting frame section 78 extends across the rearward end of the central frame section. The lateral frame section is connected to the main frame by suitable load spring units 79.

Frame braces 82 are connected to the laterally projecting ends of the frame section 78 and converge towards each other proceeding forwardly along the central frame section 76. The forward ends of the braces 82 are attached to the central frame 76 by a connecting plate structure 84.

Opposite lateral ends of the lateral frame section 78 are connected to the wheel assemblies 18, 20 by steering pivot constructions 85, 86, respectively. The pivot constructions 85, 86 define generally vertical pivot axes 87, 88, respectively about which the respective wheel assemblies are pivoted to steer the truck.

The front wheel assemblies 18, 20 are identical and only the front wheel assembly 18 is described in detail. The wheel assembly 18 includes dual tires 90, 92 (FIG. 2) which are attached to a rotatable hub 94. The hub 94 and tires rotate about a horizontal axis 95 on the centerline of the hub and tires to propel the vehicle 10 along the ground.

An electric drive motor 96 drives the hub 94 through a suitable transmission 98. The motor and transmission may be of any suitable construction and therefore are not illustrated in detail or further described. A motor housing 99 surrounds and supports the motor.

The pivot construction 85 includes aligned pins or trunions 102 which are attached to the motor housing 99 and extend in opposite directions vertically. The pins 102 are rotatably received in knuckles 103, 104 at upper and lower sides, respectively, of the frame section 78. The steering axis 87 extends through the centerlines of the pins or trunions 102.

The wheel assembly 18 pivots about the axis 87 to turn the vehicle. The steering axis 87 is located rearwardly along the frame 12 from the axis of rotation 95 of the hub 94 and tires. The axis 87 is located inboard from the inboard tire 92 between that tire and the frame member 30. Since the steering axis 87 is located rearwardly of the axis of rotation of the tire 92, the tire 92 is capable of pivoting about the steering axis 92 through a relatively large angle before contacting the frame member 30 rearwardly of the steering axis. This enables the truck to turn left relatively sharply.

The pivot construction 86 is substantially the same as the pivot contruction 85 and includes pins or trunions 105 extending from the motor housing 99 of the wheel assembly 20. The pins 105 are rotatably received by knuckles 106, 107 at the upper and lower sides, respectively, of the frame section 78.

The steering axis 88 of the wheel assembly 20 extends through the axes of the pins 105. Because of this location of the steering axis 88, the wheel assembly 20 can be pivoted to enable a relatively sharp right turn without interference between the inboard tire of that assembly and the frame member 32.

The wheel assemblies are pivoted about their steering axes by hydraulic actuators. The wheel assembly 18 is pivoted about its steering axis 87 by a ram 112. The housing 99 carries arms 108, 110 which are spaced vertically apart and project rearwardly away from the housing beyond the pivot pins 102. The arm 108 forms a steering knuckle which is connected to the hydraulic ram 112. A piston rod 114 of the ram is attached to the knuckle 108 by a clevice 116. The cylinder 118 of the ram 112 is anchored to the lateral frame section 78 by a clevice 120.

The housing 99 of the wheel assembly 20 carries a steering sknuckle 122 which projects rearwardly from the pins 106 adjacent the upper side of the housing 99. A hydraulic ram 124 is connected between the knuckle 122 and the frame section 78 for pivoting the wheel assembly 20 about its steering axis 88. The ram 124 has a piston rod 126 which is attached to the knuckle 122 by a clevice 128. The cylinder 130 of the ram is attached to the lateral frame section 78 by a clevice 132. As shown, the ram 124 is spaced vertically above the ram 112.

The hydraulic rams 124, 122 may be single or double acting, as desired. The hydraulic connections between these rams and the hydraulic system of the vehicle may be conventional and thus are not shown. Controls governing operation of the rams may likewise be conventional and are constructed for operation from the operator's cab.

Steering geometry of the front wheels is maintained by a tie rod 134. The tie rod 134 extends between the arms 110 of each of the housings 99. The ends of the tie rod are hinged to the arms 110 to permit free relative rotation between the arms and the tie rod ends during steering while rigidly connecting the wheel assemblies 18, 20 for parallel tracking.

Figure 6:
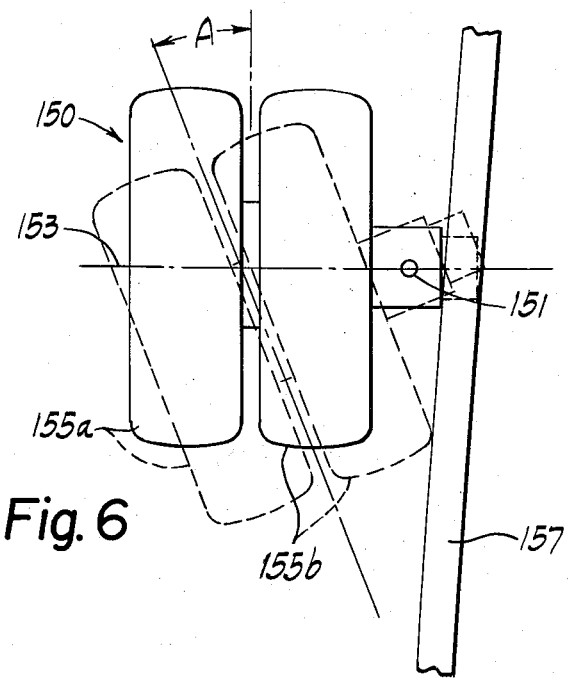
FIG. 6 schematically shows a steering arrangement constructed according to the prior art; and, FIG. 7 schematically shows a steering arrangement according to the present invention.

FIG. 6 illustrates a steering arrangement for a dual tire wheel assembly 150 constructed according to prior art teaching. The steering axis 151 for the wheel assembly 150 is located transverse to the axis of rotation 153 of the tires 155a, 155b. The inboard tire 155b impinges on the adjacent main frame member 157 when the wheel assembly is steered through an angle A from a position in which the truck proceeds along a straight path.

Figure 7:
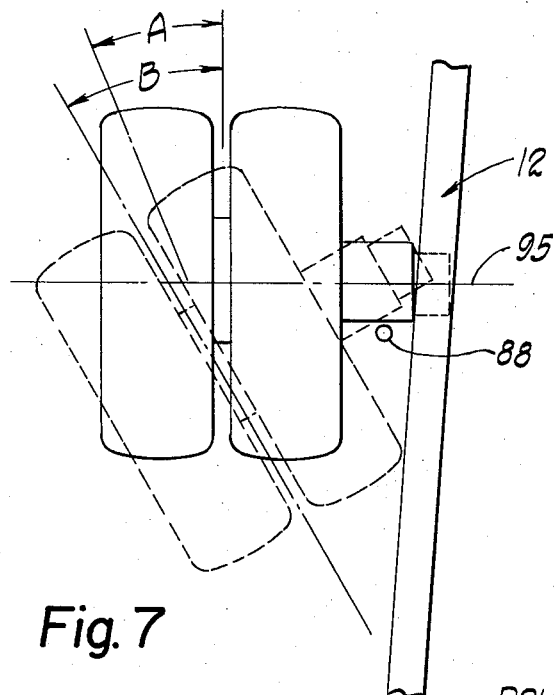

FIG. 7 schematically shows a steering arrangement constructed according to the invention and as described above. The steering axis 88 is located between the axis of rotation 95 of the wheel assembly and the wide end of the frame 12. The tires, wheel assembly and adjacent frame member are shown on the same scale as corresponding elements of the steering arrangement of FIG. 6. The inboard tire of the FIG. 7 construction is steerable through an angle B from its straight line position to the position at which the inboard tire impinges on the adjacent frame member.

The difference between the angles A and B is illustrated in FIG. 7 and it should be appreciated that the increased steering angle markedly reduces the turning radius of the vehicle employing the new steering arrangement.

While only a single embodiment of the present invention is illustrated and described, the invention is not to be considered limited to the precise construction disclosed. It is intended to cover hereby all adaptations, modifications and uses of the invention which come within the scope of the appended claims.

What is claimed is:

1. In an automotive vehicle:
    a. a vehicle frame including first and second frame members extending longitudinally of the vehicle;
    b. a first plurality of ground engaging wheel assemblies supporting said frame adjacent one end of the vehicle, a second plurality of ground engaging wheel assemblies supporting said frame adjacent the other end of the vehicle, said wheel assemblies including ground engaging members rotatable about generally horizontal axes of rotation;
    c. a rigid suspension frame connecting one of said first or second pluralities of said wheel assemblies to said vehicle frame, said suspension frame comprising bearing structure connecting said suspension frame to said vehicle frame at a location spaced longitudinally along said vehicle frame from said one of said first or second plurality of wheel assemblies for enabling pivotal movement of said suspension frame and said one plurality of wheel assemblies relative to said vehicle frame about said location;
    d. steering mechanism for said one plurality of wheel assemblies comprising pivot structures connecting respective wheel assemblies of said one plurality of wheel assemblies to said suspension frame and defining generally vertical steering axes, each steering axis located adjacent the respective wheel assembly of said one plurality of wheel assemblies and actuator means connected between said suspension frame and said wheel assemblies for pivoting said wheel assemblies about said respective steering axes;
    e. each of said pivot structures spaced longitudinally relative to said vehicle frame from the horizontal axis of rotation of the associated wheel assembly; and,
    f. said one plurality of wheel assemblies each including an electric drive motor drivingly connected to said ground engaging member, said drive motors pivotable about said steering axes with said wheel assemblies.

2. A vehicle as claimed in claim 1 wherein said ground engaging members of each of said forward wheel assemblies comprise dual tires.

3. A vehicle as claimed in claim 2 wherein said actuator means comprises an actuator connected between said suspension frame and one of said support housings, said actuator operable to pivot said support housing about said steering axis to turn said wheel assembly.

4. A vehicle as claimed in claim 3 further including a tie rod connecting said support housings of said wheel assemblies together for maintaining the steering geometry of said wheel assemblies.

5. In a vehicle as claimed in claim 1 wherein said frame members are generally nonparallel such that the transverse dimension of the frame is relatively narrower adjacent one end of the frame than adjacent the other end of the frame, said one plurality of wheel assemblies disposed adjacent the relatively narrower end of said frame.

6. In a vehicle as claimed in claim 1 wherein said frame members are generally nonparallel such that the transverse dimension of the frame is relatively wider adjacent one end of the frame than adjacent the other end of the frame, said pivot structures disposed between the relatively wider end of said frame and the horizontal axis of rotation of the respective associated one of said wheel assemblies.

* * * * *

UNITED STATES PATENT OFFICE
CERTIFICATE OF CORRECTION

Patent No. 3,786,889    Dated January 22, 1974

Inventor(s) Douglas M. Kelley

It is certified that error appears in the above-identified patent and that said Letters Patent are hereby corrected as shown below:

In Column 6, Line 49, cancel beginning with "2. A vehicle as claimed" to and including "wheel assemblies comprise dual tires." in Column 6, Line 51, and insert the following claim:

> 2. A vehicle as claimed in Claim 1 and further including a support housing for each motor, said support housing connected to said suspension frame by said pivot structures.

Signed and sealed this 8th day of October 1974.

(SEAL)
Attest:

McCOY M. GIBSON JR.
Attesting Officer

C. MARSHALL DANN
Commissioner of Patents